US006205425B1

(12) United States Patent
Ho

(10) Patent No.: US 6,205,425 B1
(45) Date of Patent: Mar. 20, 2001

(54) SYSTEM AND METHOD FOR SPEECH RECOGNITION BY AERODYNAMICS AND ACOUSTICS

(76) Inventor: Kit-Fun Ho, 19B Beverley Heights, Belair Gardens, Shatin (HK)

( * ) Notice: Subject to any disclaimer, the term of this patent is extended or adjusted under 35 U.S.C. 154(b) by 0 days.

(21) Appl. No.: 08/953,970

(22) Filed: Oct. 20, 1997

Related U.S. Application Data

(63) Continuation-in-part of application No. 08/715,750, filed on Sep. 19, 1996, which is a continuation of application No. 08/273,778, filed on Jul. 12, 1994, which is a continuation of application No. 08/104,407, filed on Aug. 10, 1993, which is a continuation of application No. 07/831,660, filed on Feb. 7, 1992, which is a continuation of application No. 07/410,824, filed on Sep. 22, 1989, and a continuation-in-part of application No. 08/715,750, filed on Sep. 19, 1996.

(51) Int. Cl.[7] .............................. G10L 15/02; G10L 11/00
(52) U.S. Cl. .......................... 704/251; 704/231; 704/270
(58) Field of Search .................................... 704/231, 234, 704/241, 242, 251–257, 270, 276

(56) References Cited

U.S. PATENT DOCUMENTS

| 4,335,276 | * | 6/1982 | Bull et al. ............................. 704/276 |
| 4,718,096 | * | 1/1988 | Meisel .................................. 704/253 |
| 5,680,505 | * | 10/1997 | Ho ....................................... 704/251 |

* cited by examiner

*Primary Examiner*—David D. Knepper

(57) ABSTRACT

Speech recognition and speech commands are achieved by inputting aerodynamic component and acoustic component of a speech utterance. The aerodynamic and acoustic components are recognized by pattern matching and/or by rules. A helmet for inputting speech is also disclosed.

7 Claims, 12 Drawing Sheets

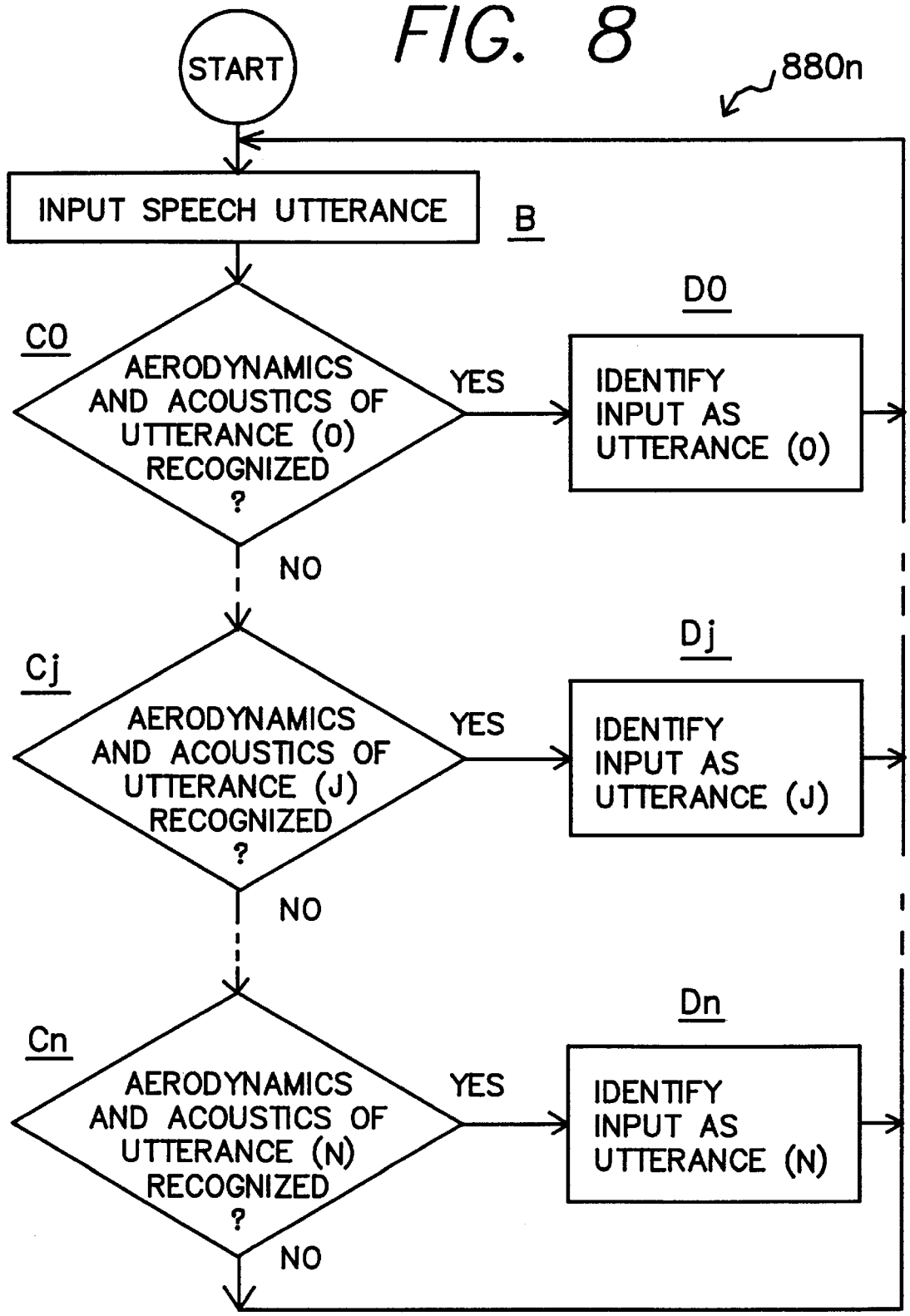

SYSTEM AND METHOD FOR SPEECH RECOGNITION BY AERODYNAMICS AND ACOUSTICS

This is a continuation-in-part of Ser. No. 08/715,750, filed Sep. 19, 1996, now U.S. Pat. No. 5,680,505, granted Oct. 21, 1997, which is a continuation of application Ser. No. 08/273,778, filed Jul. 12, 1994, which is a continuation of application Ser. No. 08/104,407, filed Aug. 10, 1993, which is a continuation of application Ser. No. 07/831,660, filed Feb. 7, 1992, which is a continuation of application Ser. No. 07/410,824, filed Sep. 22, 1989.

This continuation-in-part of Ser. No. 08/715,750, filed Sep. 19, 1996, now U.S. Pat. No. 5,680,505, granted Oct. 21, 1997, is also related to co-pending divisional application Ser. No. 08/715,170, filed Sep. 17, 1996 and also related to co-pending divisional application Ser. No. 08/715,119, filed Sep. 17, 1996.

BACKGROUND OF THE INVENTION

1. Field of the Invention

The present invention relates to the detection, analysis, and recognition of speech and is especially concerned with systems utilizing speech air flow, and, also concerned with positioning a plurality of transducers in front of a speaker's mouth for detecting and responding to air flow patterns in space and time. The present invention is particularly concerned with systems and methods for recognizing speech utterances by the aerodynamics and acoustics of the speech utterances.

The present invention also relates to adding an aerodynamic dimension with regard to conventional acoustic only speech signals.

2. Description of the Prior Art

Numerous systems for speech detection, analysis, and recognition and speech control have been proposed. See, for example, U.S. Pat. Nos. 4,718,096 issued to Meisel for "SPEECH RECOGNITION SYSTEM", 4,590,604 issued to Feilchenfeld for "VOICE-RECOGNITION ELEVATOR SECURITY SYSTEM", and 4,618,985 issued to Pfeiffer for "SPEECH SYNTHESIZER", and U.K. Patent Application No. 2,087,617 A by Ichikawa et al for "CONTINUOUS SPEECH RECOGNITION METHOD AND APPARATUS", and French Patent Application No. 2,559,325 by Dubus et al for speech capture apparatus.

SUMMARY OF THE INVENTION

The present invention is directed to a system and method for analysing and recognizing speech by air flow assciated with air flow through the vocal chord and by the acoustic sound produced during speech production.

Accordingly the present invention also provides a system and method for achieving speech commands by the detection of air flow pattern in the proximity of the mouth in space and time and the detection of spoken sound during an utterance.

And accordingly the present invention also provides a system and method for utilizing the aerodynamics and acoustics of speech utterances.

The system and method of the present invention have advantage over the reference patents cited above that it may work with both audible and inaudible utterances.

In addition, existing speech recognition systems have difficulty in recognizing speech utterances which sound alike even though such utterances may have quite different air flow in the proximity of the mouth in space and time. The present invention has the advantage of being capable of identifying different speech sounds that sound alike whereas their air flow patterns are quite different. For example, many speech words that sound alike may begin with say, "b", "t", "d", "p", "f", or "th", respectively, which have different air flow patterns and/or other air flow properties in the space around the mouth when uttered. Of course, different air flow patterns may also be detected and identified in the middle portions of speech words that sound alike to the ear.

The system and method of the present invention also identifies inaudible rush of air out of or into the mouth during an utterance and between utterances.

Another advantage is that since the method of the present invention detects the air flow pattern around the mouth, it may differentiate between noises in the surrounding from the utterance picked up out of the mouth of a speaker.

The present invention has another advantage that it identifies the speech utterance out of the mouth of a speaker physically present in which case air flow pattern is detected and differentiates from speech utterance from a speaker at a distance in which case no air flow pattern is picked up.

An object of the present invention is to detect and utilize speech air flow, for example, for analysing and studying speech, for recognizing speech, and for accomplishing speech commands, etc.

Another object of the present invention is to provide a device for measuring speech air flow.

Another object of the present invention is to analyse speech by air flow properties.

Another object of the present invention is to recognize speech by air flow properties.

Another object of the present invention is to utilize speech air flow properties as speech commands.

Another object of the present invention is to provide a speech recognition system operable at high noise levels.

Another object of the present invention is to provide a speech control system operable at high noise levels.

Another object of the present invention is to provide means for extracting and analysing speech signals comprising analogues of speech air flow.

Another object of the present invention is to provide means for extracting speech features comprising air flow features.

Another object of the present invention is to provide a system wherein speech is defined by quantities comprising quantities representative of speech air flow properties.

Another object of the present invention is to provide a system wherein speech air flow properties are used to time the speed of a speech utterance.

Another object of the present invention is to provide a speech controlled system operable with softly uttered commands, such as whispered commands.

Another object of the present invention is to provide a system for distinguishing speech entered by a human speaker from background sounds.

Another object of the present invention is to provide a system for utilizing the analogues of air flow quantities of speech.

Another object of the present invention is to utilize speech air flow quantities as means for measuring the speed of speech production.

Another object of the present invention is to detect plosive and fricative utterances.

Another object of the present invention is to provide a speech recognition system relatively immune to background noise sounds.

Another object of the present invention is to provide a system for responding to speech inputs, comprising a plurality of transducers mounted in front of a speaker's mouth to respond to air flow patterns with the output of the transducers being connected to a computer system or other responding subsystems.

Another object of the present invention is to provide a system for recognizing the emotion or manner with which speech is input, for example whether the input speech is spoken in a relaxed manner or a stressed manner.

Another object of the present invention is to provide a headgear (e.g. a helmet) comprising a plurality of transducers mounted on the headgear for detecting and untilizing speech air flow from the mouth of a speaker wearing said headgear.

Another object of the present invention is to provide a helmet for speech input by inputting the aerodynamic signal and acoustic signal of speech utterance.

Another object of the present invention is to provide a means for speech input by inputting the aerodynamic signal and acoustic signal of speech utterance which is relatively insensitive to the speaker head movement.

Another object of the present invention is to provide a helmet for speech input which is relatively insensitive to external noise.

Another object of the present invention is to provide a helmet for speech input which is relatively insensitive to external aerodynamic wind.

Further objects and advantages of my invention will become apparent from a consideration of the drawings and ensuing description of it.

The same system and method of the present invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 8 is a flow chart illustrative of an operation of the system constructed in accordance of the teaching of the present invention.

DESCRIPTION OF THE PREFERRED EMBODIMENTS

The principles of the present invention are capable of being applied with hardware and/or with software in a variety of manners, several of which, with variations, will be described herein.

Figure 1A:
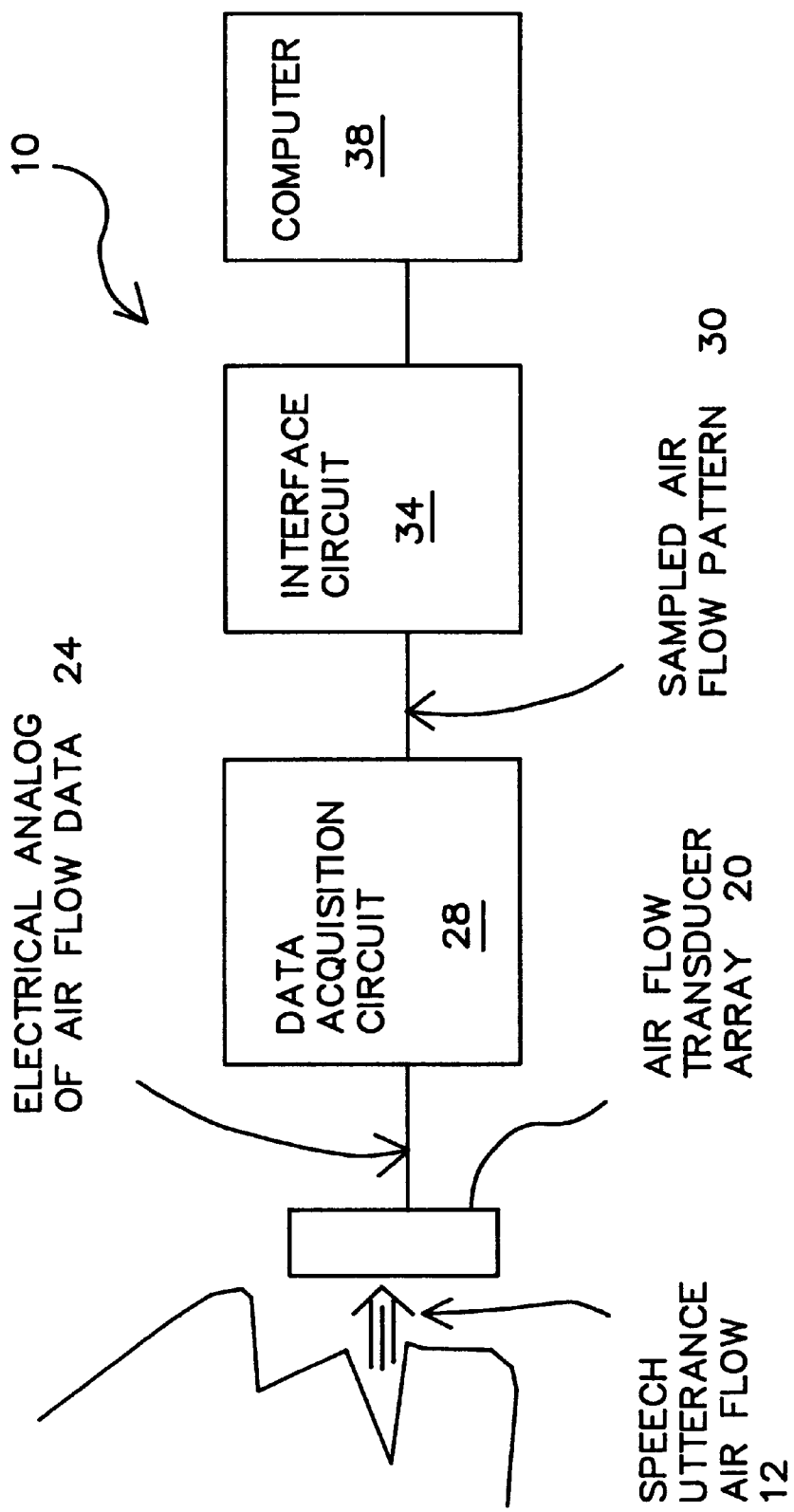
FIG. 1A is a block diagram of a system constructed in accordance with the teachings of the present invention.
Figure 1B:
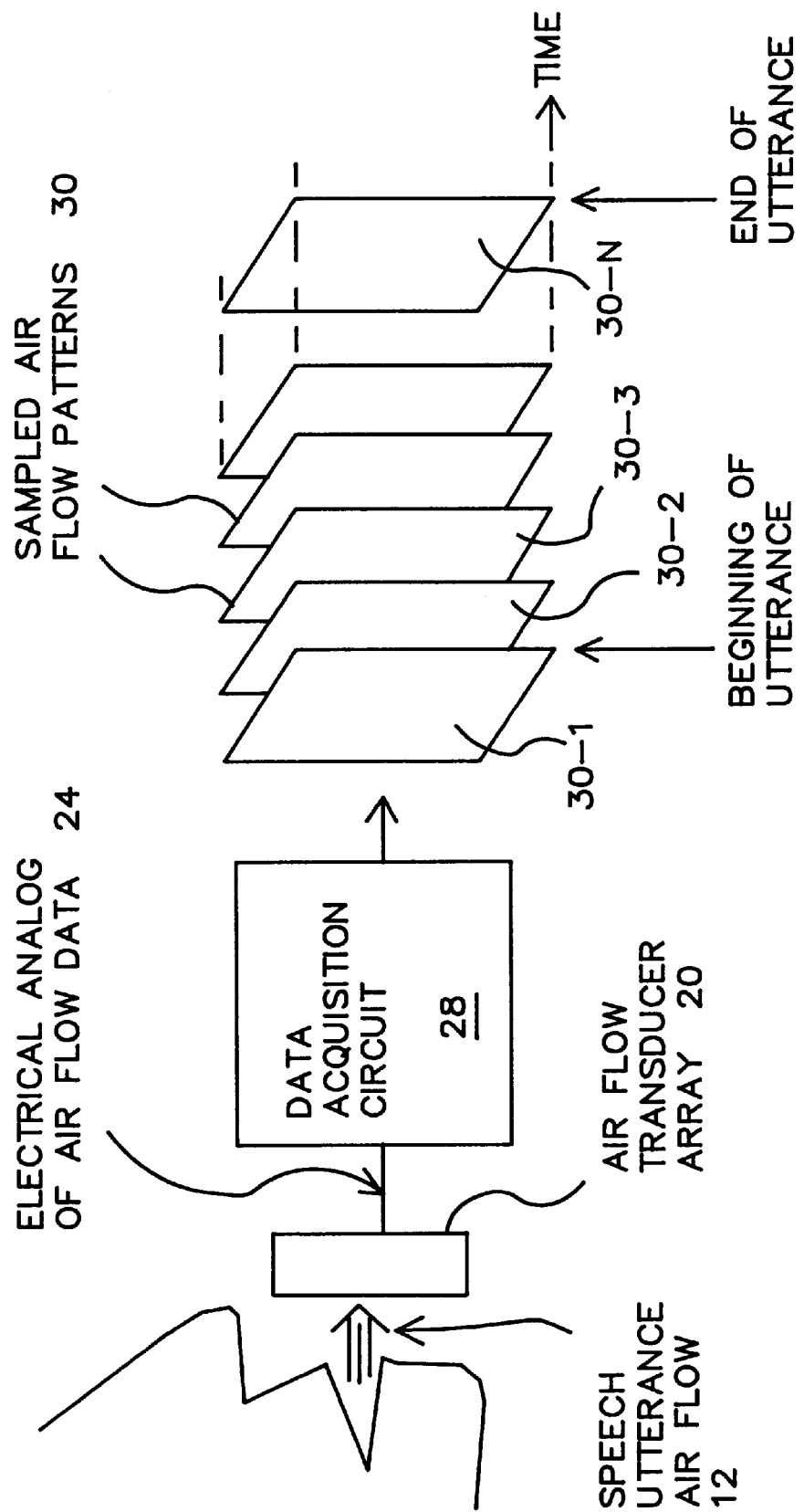
FIG. 1B is a diagram relating to a time series of sampled air flow patterns illustrative of the operation of the invention.

A system constructed in accordance with the present invention is shown in FIGS. 1A and 1B and is generally identified therein by reference numeral 10. The system 10 is responsive to speech utterance air flow 12 input to the system. The system 10 includes an air flow transducer array 20 positioned in front of a speaker's mouth and fixed in position relative to the speaker's head. Generally the transducer array 20 comprises more than one transducer element located at different points in space. Upon a specific speech utterance input from the speaker the transducer array 20 produces electrical outputs in response to and representative of the speech utterance air flow 12 detected at, in this case, more than one point in space in the vicinity of the speaker's mouth during the speech utterance. In this manner, the air flow transducer array 20 continuously outputs electrical analog of air flow data 24 which is fed to data acquisition circuit 28. The data acquisition circuit 28 serves to sample the electrical analog input data 24 and output in digital form a time series of the sampled air flow patterns 30 which represent a series of "snapshots" 30-1, 30-2, 30-3, . . . , 30-N of the air flow patterns of the specific utterance. These electrical "snapshots" in digital form may be readily fed through an interface circuit 34 to a digital computer 38. At the computer 38 these electrical "snaphots" patterns are analysed and recognized in the same general manner as in pattern recognition, which is a widely known and well developed art. Thus, in the same manner as in pattern recognition the computer 38 is programmed to (a) analyse the received "snapshot" patterns, i.e. the sampled air flow data associated with the speech utterance, (b) extract the air flow features, (c) match the extracted features with stored or pre-defined reference features of a vocabulary of utterances, and (d) identify the detected utterance, whereby the specific utterance may be recognized and its features may be displayed. The computer 38 may be additionally programmed to execute a command in accordance with the recognized utterance, whereby speech commands may be achieved.

Figure 2A:
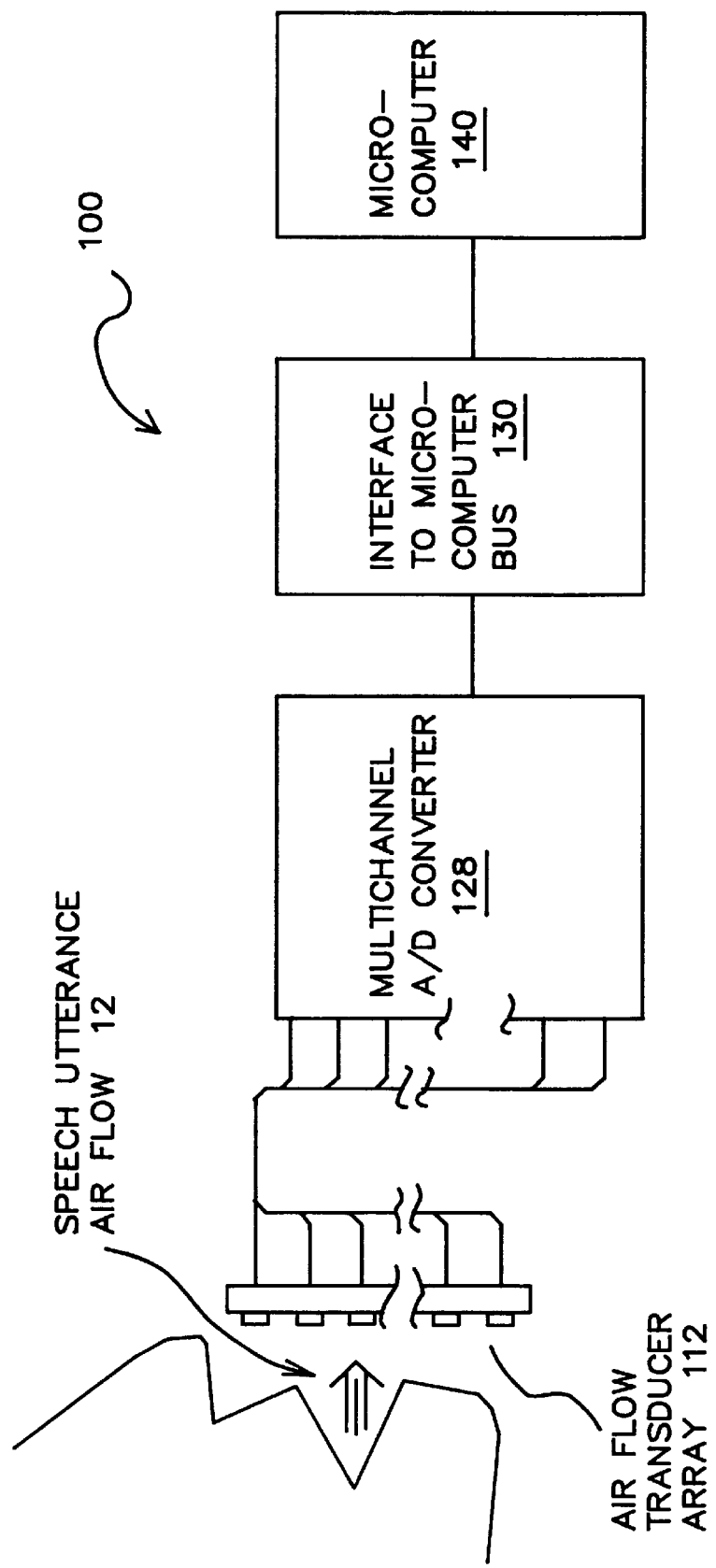
FIG. 2A is a block diagram of a more specific system constructed in accordance with the teachings of the present invention.
Figure 2B:
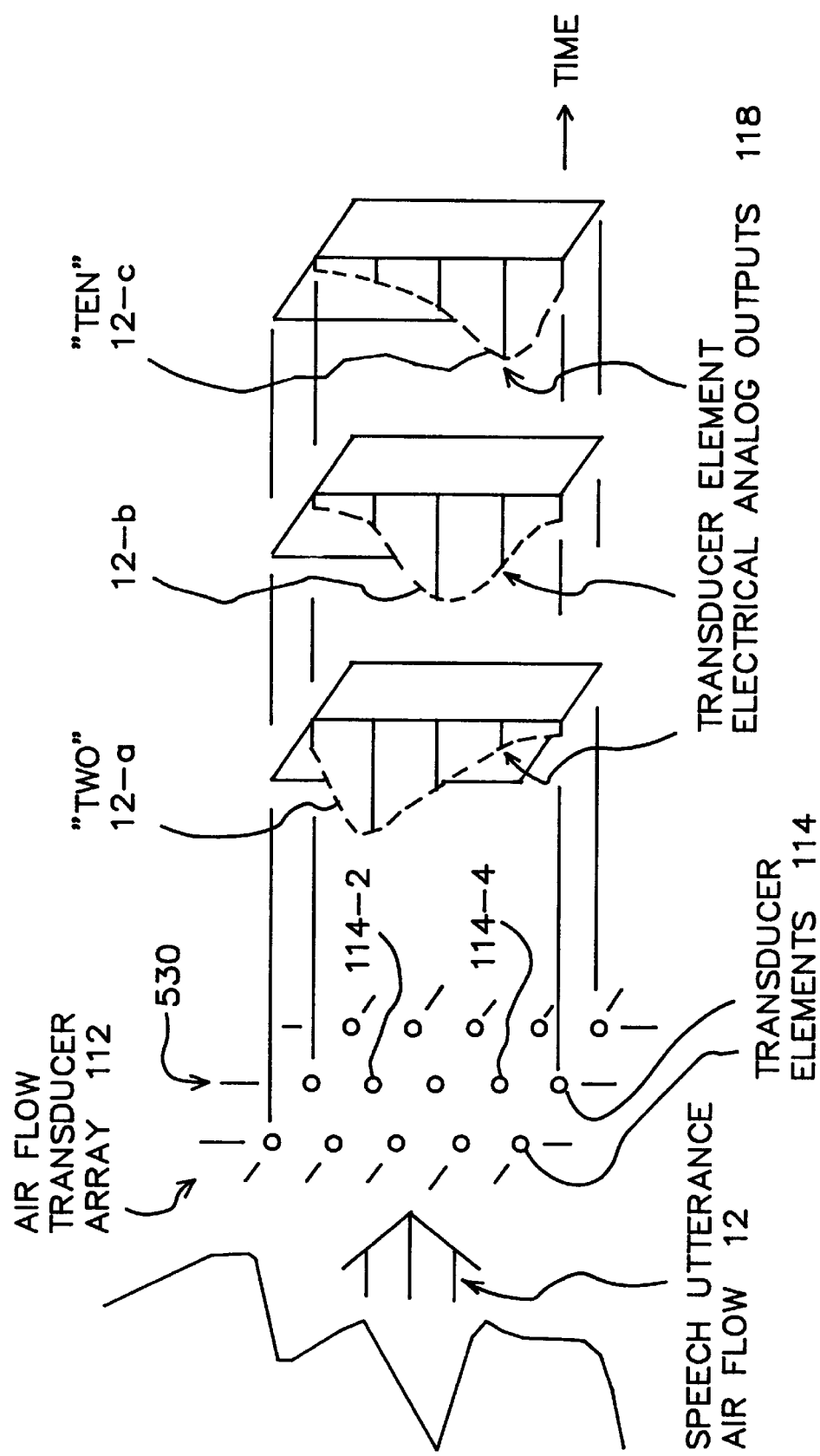
FIG. 2B is a diagram showing the structure of a specific transducer array of the present invention, which is responsive to a variety of air flow patterns of specific speech utterances illustrative of the operation of the invention.

In FIGS. 2A and 2B there is shown a more specific system 100 of the present invention. Speech utterance air flow 12 of a specific speech utterance such as "TWO" 12-a or "TEN" 12-c, etc. is detected with an air flow transducer array 112 which is positioned in front of a speaker's mouth and fixed in position relative to the speaker's head. The transducer array 112 is constructed with a number of transducer elements 114 including elements 114-2 and 114-4 arranged in a specific pattern, such as shown in FIG. 2B. The transducer array 112 is positioned close to and in front of the mouth of the speaker with element 114-2 at about 1 cm from the lips of the speaker, to pick up speech utterance air flow 12. The transducer element electrical analog outputs 118, representative of the speech utterance air flow 12, are fed to respective channels of a multichannel A/D converter 128, converted into digital form and then fed through an interface to microcomputer bus 130 to a microcomputer 140. In a specific embodiment the microcomputer 140 can be an APPLE II(trademark) microcomputer, and the multichannel A/D converter 128 and interface 130 may take the form of a commercially available multiplexed, multichannel, such as 16 channels, A/D converter board which alreadly includes suitable interfacing to the APPLE II(trademark) microcomputer. Again, the microcomputer 140 is programmed in the same manner as in pattern recognition to analyse the sampled air flow data detected with the speech utterance, to extract the air flow features, to compare the extracted features with stored or pre-defined reference features of a vocabulary of utterances, and to identify the detected utterance.

The system of the present invention may also be embodied in the form of a hybrid system which detects and operates with both the air flow patterns and the audible acoustic sounds of a specific speech utterance. More specifically, the system of the present invention may be embodied in the form of a system comprising a first subsystem to detect the air flow pattern of a speech utterance, and a second subsystem to detect the audible acoustic sounds of same speech utterance. The construction of the first subsystem may be similar to the system 10 of FIG. 1A. The second part may be similar to existing speech recognition systems which picks up with a microphone the audible acoustic sounds, i.e. the audible spectrum frequency components. The hybrid system may be programmed or hardwired such that an input speech utterance is declared recognized only if both subsystems identify same. For example, it may be embodied to operate in a manner as is illustrated by the general sequence or process 88 on of FIG. 8, where a speech utterance is input at stage B, and, dependent on the particular input speech utterance it may proceed up to stage C0, or Cj, or Cn, etc. to determine if the aerodynamics and acoustics of a known utterances are recognized. And if, say, at stage Cj the aerodynamics and acoustics of known speech utterance (J) are recognized it then proceeds to stage Dj to identify the input speech utterance as the known utterance (J). In this manner, the embodiment of the hybrid system of the present invention has the advantage of being more discriminating than the systems of the references cited above, which systems only detect the audible sound components of speech utterance. This is achieved because the hybrid system of the present invention identifies and recognizes an extra dimension of speech utterance, namely the air flow components of speech utterance.

Figure 3A:
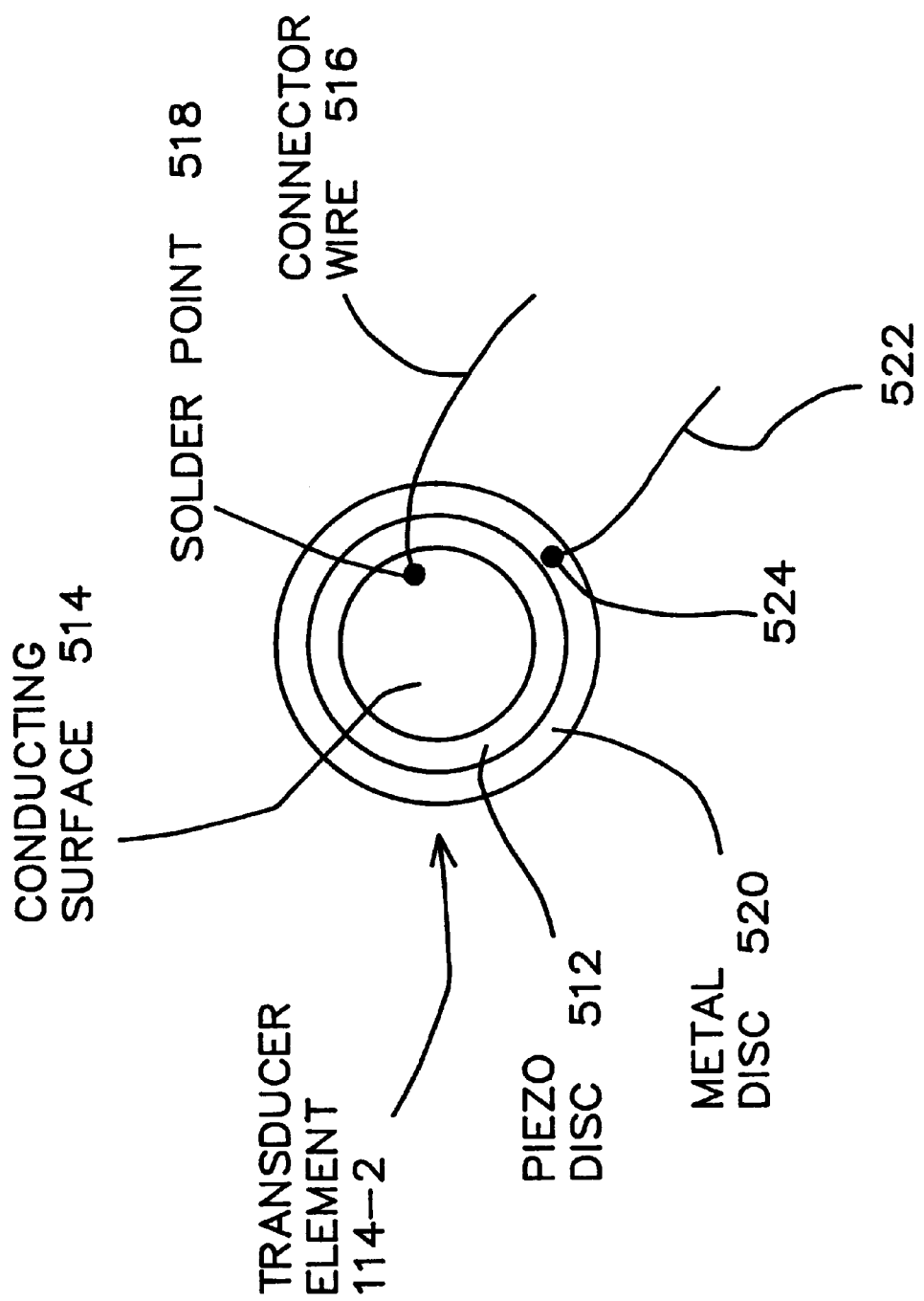
FIG. 3A is a diagram relating to the construction of transducer elements.

As described above the transducer element of the present invention outputs an electrical analog representative of the air flow detected. The transducer element 114 may be constructed in a manner similar to piezo sound discs, such as those used in buzzers and musical greeting cards. Referring to FIG. 3A, the transducer element 114-2 may be constructed with a piezo disc 512 having an exposed conducting surface 514 which is connected to a connector wire 516 at solder point 518. A similar conducting surface at the other side of the disc is adhered and electrically connected to a metal disc 520 which is connected to a connector wire 522 at solder point 524. In the prototype of a specific embodiment of the system of the present invention the transducer element 114-2 is constructed with a piezo disc 512 of 13 mm diameter, the conducting surface being 12 mm in diameter and the metal disc 520 being 15 mm in diameter.

Figure 3B:
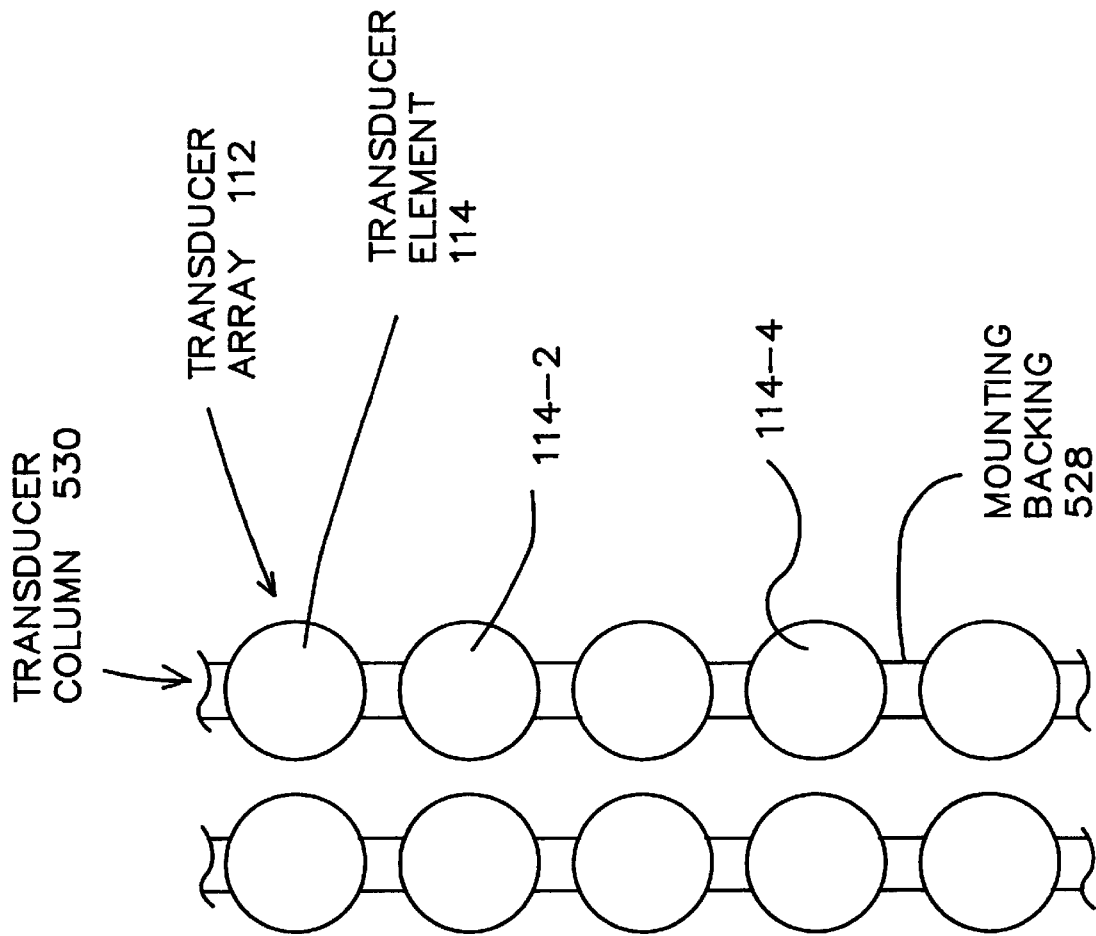
FIG. 3B is a diagram illustrative of the construction of transducer arrays.

It worked very well in the prototype and it produces a peak voltage of more than 0.2 V when "TWO" is being spoken, while the transducer is fixed in a position such that referring to the speaker's closed lips the exposed surface 514 is directly facing the lips and at a distance of about 1 cm from the lips, the piezo disc 512 being so oriented that the exposed conducting surface is positive, i.e. of positive polarity, with respect to the metal disc 520. Furthermore, by mounting transducers 114 along a rod or a bar or other similar mounting backing 528 as shown in FIG. 3B we may construct a transducer column 530. And grouping two or more columns as shown in FIG. 3B we may construct a transducer array 112. In the prototype the center-to-center distance between adjacent transducers in a column is about 16 mm and it works well.

Figure 4:
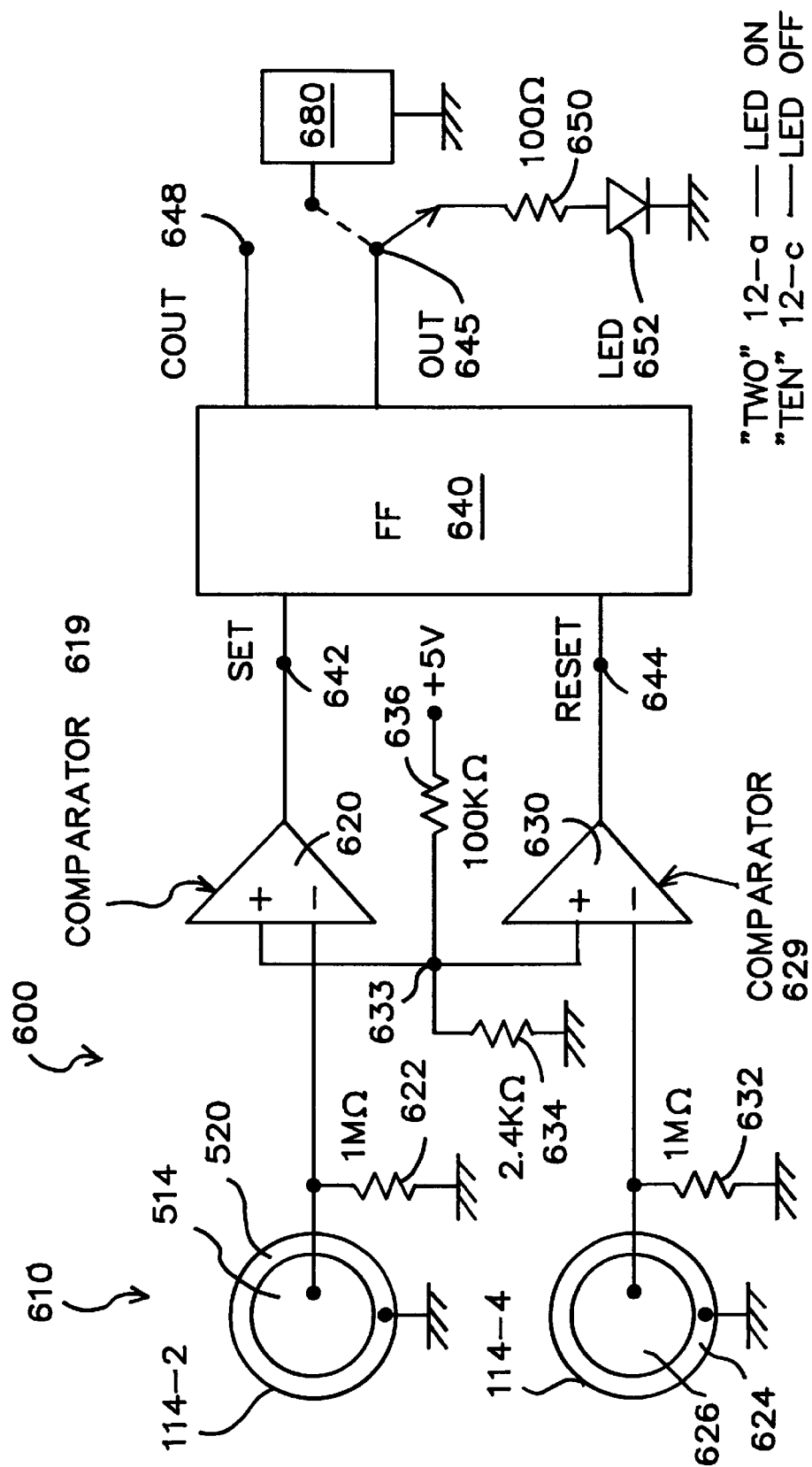
FIG. 4 is a circuit diagram for a system constructed in accordance with the teachings of the present invention.

Alternatively, the system and method of the present invention may be embodied in various manners. Referring to FIG. 4, there is shown another system 600 constructed in accordance with the present invention which is economical to construct and simple to use. The system 600 includes a transducer array 610 consisting of an upper transducer 114-2 having the same construction and dimensions as the specific transducer element 114-2 described earlier, and an identical lower transducer element 114-4 with metal disc 624 and exposed conducting surface 626. The center-to-center distance between the two transducers is about 31 mm. The position of array 610 is fixed with respect to the head of the speaker. Referring to the speaker's head in up right position with lips closed, the array is positioned vertically with the normal axis of the upper transducer 114-2 pointing to the mid point of the line where the lips meet, and the upper transducer 114-2 is at a distance of about 1 cm from the lips. The upper transducer 114-2 has its metal disc 520 connected to chassis ground and its exposed conducting surface 514 connected to the negative input of a comparator 619 constructed with an operational amplifier 620, 514 being also connected to an input resistor 622 which is connected to chassis ground. The lower transducer 114-4 has its metal disc 624 connected to chassis ground and its exposed conducting surface 626 connected to the negative input of a comparator 629 constructed with an operational amplifier 630, 626 being also connected to an input resistor 632 which is connected to chassis ground. A potential divider is formed with series resistors 636 and 634, their common point being 633, 636 being connected to +5 V and 634 to chassis ground, i.e. 0 V. The positive inputs of both comparators 619 and 629 are connected to 633 at which junction a reference voltage is provided to both comparators. Thus, if the upper transducer produces a positive voltage at 514 greater than the reference voltage then the output of comparator 619 will be LOW (i.e. about 0 V), otherwise it will be HIGH (i.e. about +5 V). Similarly, if the lower transducer produces a positive voltage at 626 greater than the reference voltage then the output of comparator 629 will be LOW (i.e. about 0 V), otherwise it will be HIGH (i.e. about +5 V). The system 600 includes a set-reset flip-flop 640 which has a set terminal SET 642, a reset terminal RESET 644, 642 being connected to the output of comparator 619 and 644 being connected to the output of comparator 629. The flip-flop 640 has an output terminal OUT 645 which is connected through current limiting resistor 650 to an LED 652 to chassis ground. The output at OUT 645 may also be coupled to turn on or off other apparatus 680. The flip-flop 640 also provides at terminal COUT 648 logical output complement to OUT 645.

In operation, the speaker may choose to speak "TWO" or "TEN" to turn the LED 652 or other apparatus 680 on or off, respectively. Namely, speaking "TWO" would produce speech air flow mainly directly at upper transducer 114-2 which produces a voltage surge greater than the reference voltage, causing the output of comparator 619 to LOW, which switches OUT 645 of the flip-flop 640 to stay at HIGH, i.e. switching on. Similarly, speaking "TEN" would produce speech air flow mainly directed at lower transducer 114-4 which produces a voltage surge greater than the reference voltage, causing the output of comparator 629 to LOW, which switches OUT 645 of the flip-flop 640 to stay LOW, i.e. switching off.

The system and method of the present invention is not limited to a particular language. For example, in a similar manner as described above, we may choose to switch the output of the system 600 at OUT 645 on or off by speaking Cantonese the Chinese charaters identified by Chinese telegraph codes 5897 and 0255, repectively. This embodiment is especially easy to use because the former character means "rush forward", and the latter meaning "halt". This is especially useful when the output at OUT 645 is employed to drive apparatus relating to physical movements.

Figure 5:
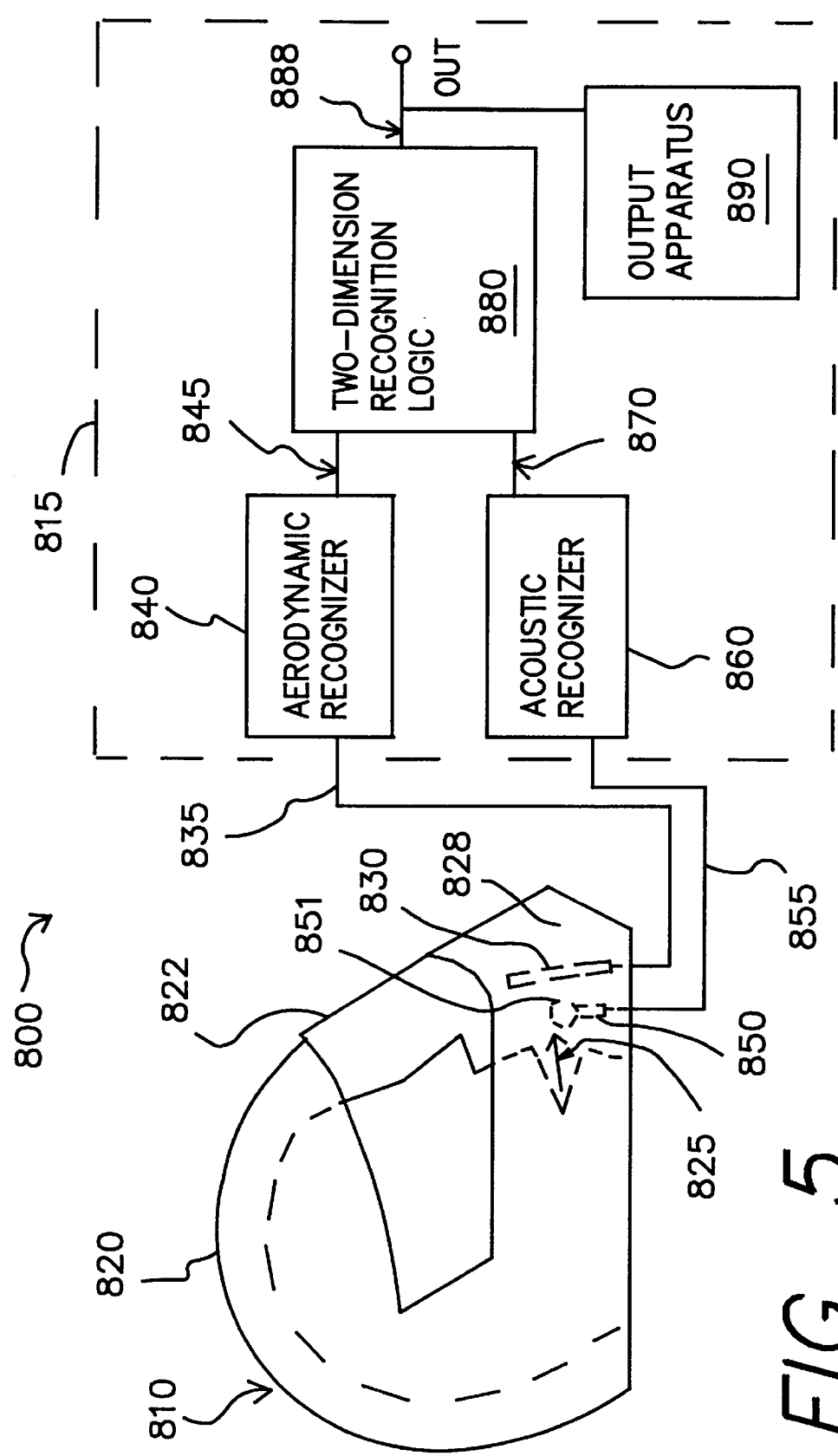
FIG. 5 is a diagram of a two physical dimension system constructed in accordance with the teaching of the present invention.
Figure 6A:
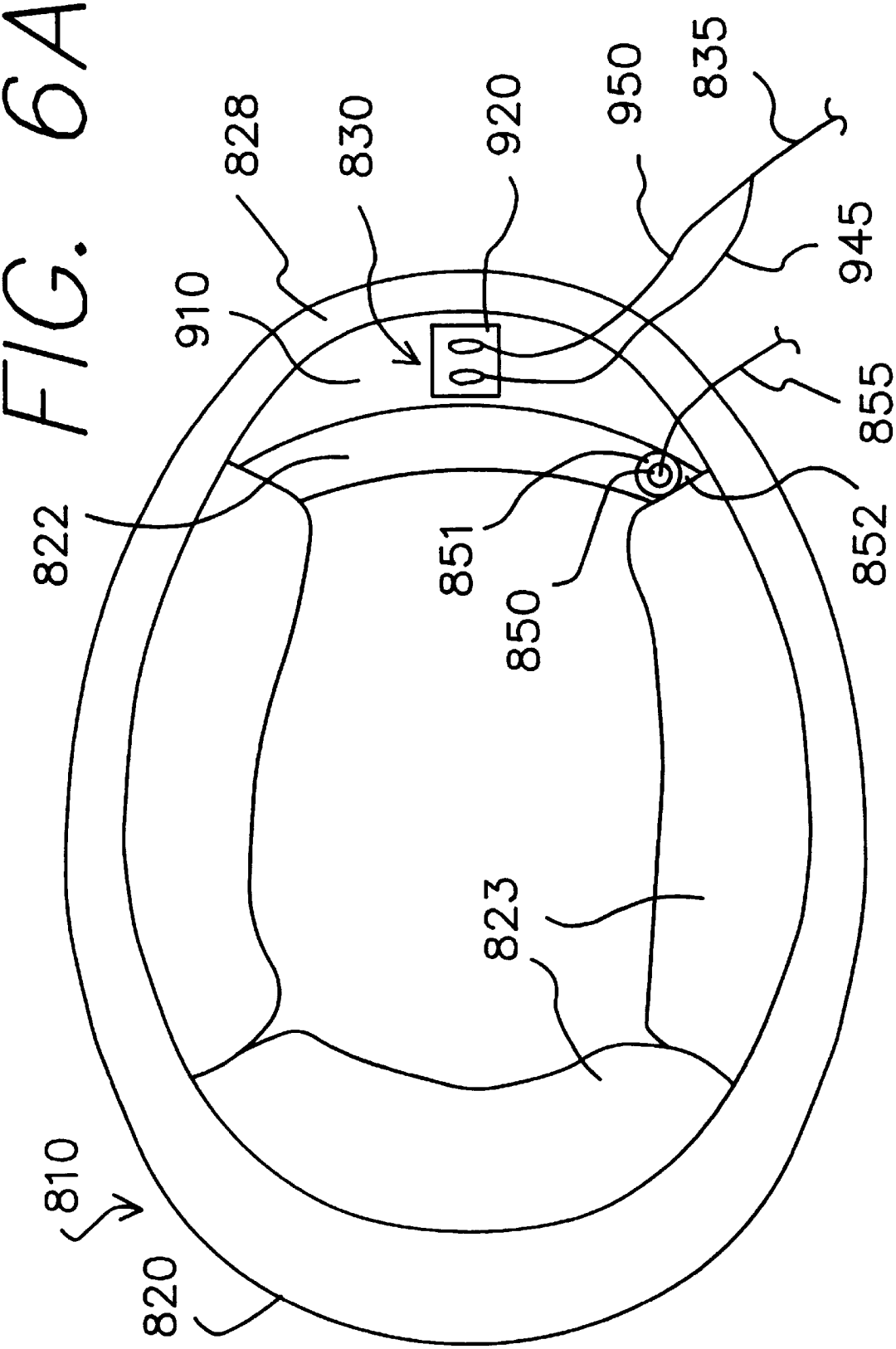
FIG. 6A is a further diagram illustrative of construction of a front end of a system constructed in accordance with teaching the present invention.
Figure 6B:
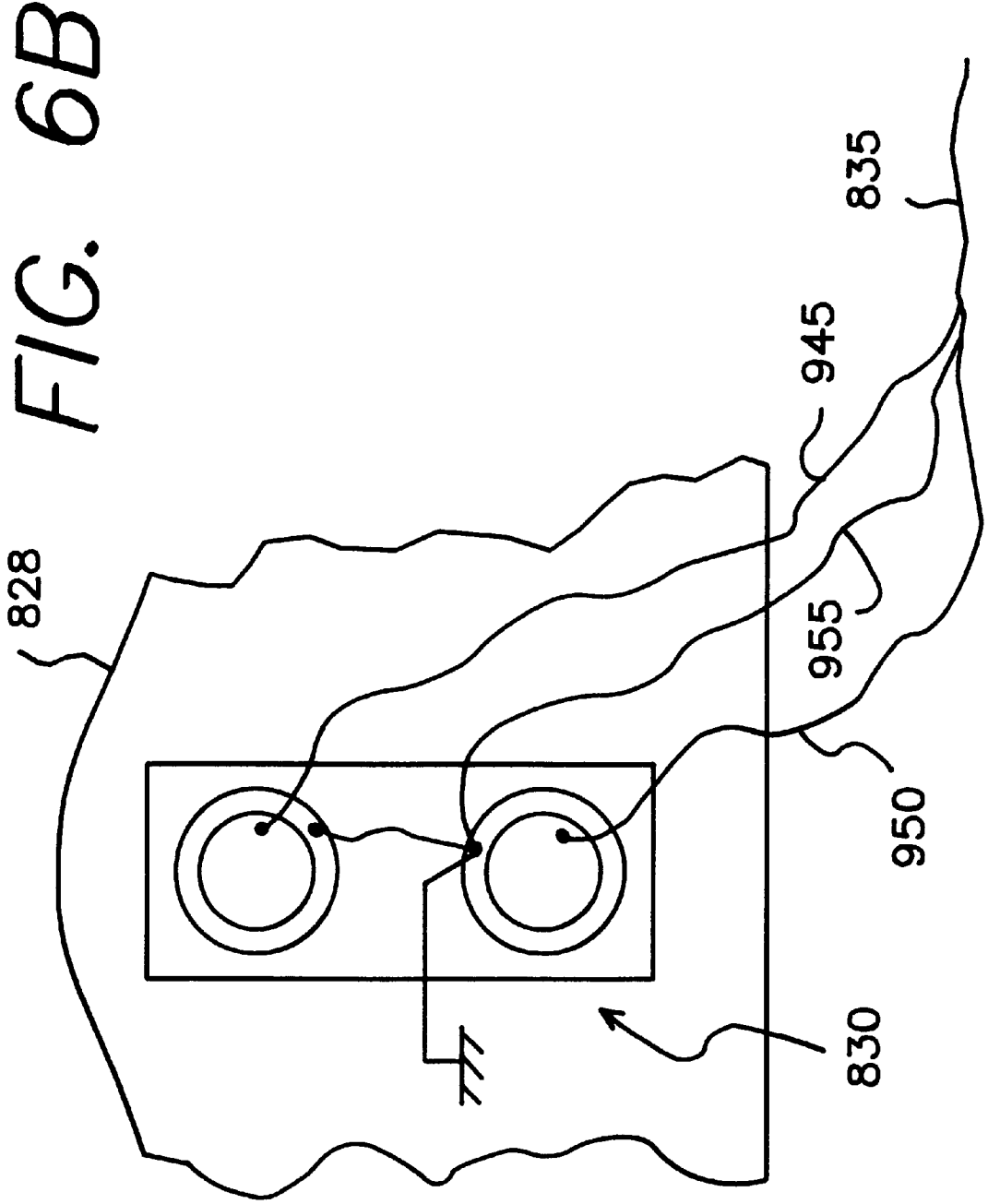
FIG. 6B is yet a further diagram illustrative of the structure of an aerodynamic input end of a system constructed in accordance with the teaching of the present invention.

Also, a system constructed in accordance with the present invention is shown in FIGS. 5, 6A and 6B and is generally identified therein by reference numeral 800. In general the system 800 comprises a speech input front end 810 connected to a two physical dimension speech recognizer 815 for recognizing speech utterances. Namely, the system 800 recognizes a speech utterance by the aerodynamic and acoustic components thereof and the operation of system 800 will be further apparent in the description below. Referring to FIG. 5 the speech input front end 810, which, in a more specific form, may be in the form of a speech input helmet. Consequently, in a specific embodiment of system 800 the front end 810 comprises a helmet shell 820 which is further fitted with a visor 822 and soft pad 823 for avoiding or subducing external noise and external aerodynamic wind and in operation the speaker wearing the speech input front end 810, i.e. the speech input helmet in this case issues a particular speech utterance 825. As shown in FIGS. 6A and 6B, in the front portion of the helmet shell 828 and along a bisecting line inside the helmet there is installed an aerodynamic wind transducer array 830 for sensing the aerodynamic wind of speech utterance 825, i.e. the speech air flow of speech utterance 825. The output of the wind transducer array 830 is fed through conductors 945 to 950 of the aerodynamic signal cable 835 to an aerodynamic recognizer 840 which gives an output 845. The transducer array 830, the aerodynamic signal cable 835 and the aerodynamic recognizer 840 are constructed and operates in accordance with the teachings of FIGS. 3A and 4. As an example, the transducer array 830, the aerodynamic signal cable 835 and the aerodynamic recognizer 840 may be implemented with a specific embodiment of the system 600 described above and in such case the output 845 of aerodynamic recognizer 840 will be HIGH if, say TWO is spoken, and LOW if TEN is spoken. At the same time the acoustic sound component of the speech utterance 825 is picked up by microphone 850 having wind shield 851 and installed to one side of the helmet with adhesive 852 as shown in FIGS. 5 and 6A and the microphone output is fed through microphone cable 855 to acoustic recognizer 860. The acoustic recognizer 860 may be implemented with a conventional speech recognition apparatus constructed and operating in accordance with well known automatic speech recognition principles and techniques, such as dynamic time warping and/or hidden Markkov model. Hence, as an example, the acoustic recognizer 860 may be implemented with a conventional, production isolated word recognizer. More specifically, and as an example the acoustic recognizer 860 is implemented with an off-the-shelf isolated word, speaker dependent speech recognition production unit, namely, the VOICE MASTER (R) PC DIGITIZER with accompanying Software Release 2.50 by COVOX Inc., consisting of a speech recognition board containing a well known A/D converter ADC8040 operating with accompanying software Software Release 2.50 which includes source listings and with USER MANUAL printed Aug. 12, 1988, which run in an IBM PC/XT (R) compatible personal computer for converting the signal of an input speech utterance into an array of binary numbers representing the input speech utterance for matching with a set of reference arrays of binary numbers representing a corresponding set of reference speech utterances. The particular reference speech utterance whose array of binary numbers best fits or matches the array produced by the input speech utterance 825 is recognized or identified to be the input speech utterance.

Figure 7:
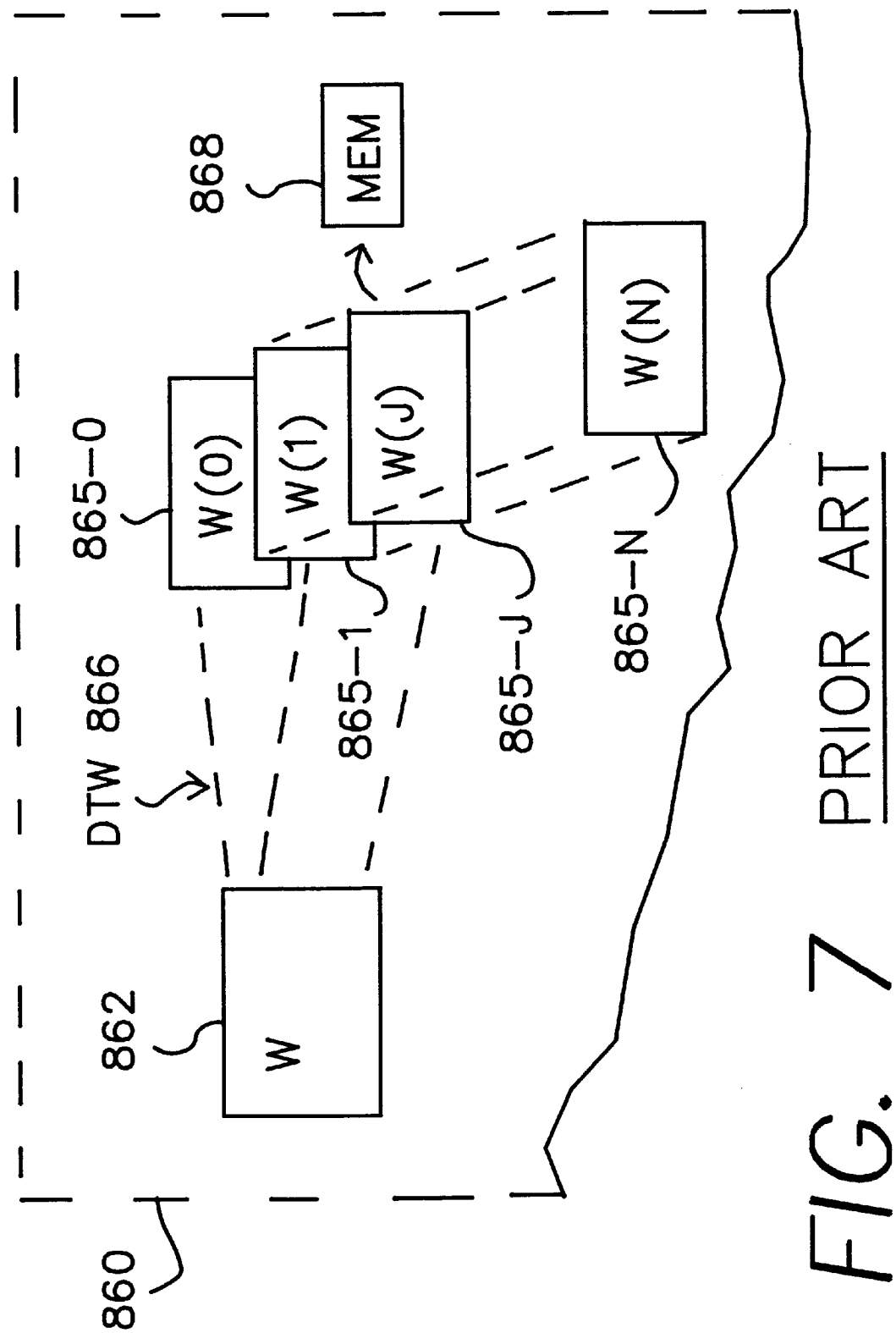
FIG. 7 is a block diagram illustrative of the operation of an acoustic recognizer constructed in accordance with the teaching of the present invention.

Hence, acoustic recognizer 860 is implemented with such a production speech recognition unit. And referring to FIGS. 5 and 7 the output signal of microphone 850, i.e. the acoustic component of speech utterance 825 is converted to an array of binary numbers 862 which is matched by dynamic time warping DTW 866 with a set of reference or trained arrays 865-0, 865-1, . . . 865-J, . . . , 865-N, also well known as reference templates. Consequently, the best fit or best matched array, say, array 865-J is therefore recognized or identified or taken to be the recognized speech utterance and the identity of array 865-J is output and/or stored in memory 868. And the recognized speech utterance may also be output by reading memory 868.

In a prototype of the present invention the acoustic recognizer 860 is implemented by using the above-mentioned speech recognition board of COVOX Inc. as a production speech recognition engine. Already provided in the above-mentioned Software Release 2.50 one needs only to (a) run the program recog.exe under DOS, and (b) run the program RECDEMO.BAS under GWBASIC and (c) press the key "2" on the keyboard to achieve acoustic speech recognition and the best matched candidate word, i.e. the recognized word is stored and available in memory and may be read or obtained by the BASIC instruction PEEK(4), thereby embodying acoustic recognizer 860. And if PEEK (4) gives 1, that means reference word 1 is recognized. And the reference words may be trained by pressing the "1" key. If, for example, TWO and TEN are to be recognized, the speech recognition engine is trained by the speaker by speaking TWO and TEN, respectively to obtain reference arrays or templates assigned to and described by the above-mentioned RECDEMO.BAS program as word (0) and word (1) and therefore PEEK(4) giving 1 would mean that TEN is recognized.

The aerodynamic recognizer output 845 and the acoustic recognizer output 870 are fed to two-dimension recognition logic 880, which is is an example of the aerodynamic and acoustic speech recognition logic of the present invention and a specific example is shown by the flowchart of FIG. 8. Of course, the principles of the present invention is not limited to word recognition. In the case of word recognition utterance (0), utterance (1), . . . , etc. refer to the above mentioned word (0), word (1), . . . , etc., respectively. The two-dimension recognition logic 880 may be implemented by hardware and/or software. Currently, the two-dimension recognition logic 880 is implemented in software in a protype of the system 800, as shown in the listing of FIG. 9. PROGRAM OF TWO-DIMENSION SPEECH RECOGNITION LOGIC as follows:

PROGRAM OF TWO-DIMENSION SPEECH RECOGNITION LOGIC

5500 AERO %=INP (672):AERO %=(AERO % AND 1): REM READ AERODYNAMIC RECOGNIZER THROUGH INPUT PORT

5501 REM

5510 IF (AERO %=1 AND PEEK(4)=0) THEN PRINT "OVERALL SYSTEM RECOGNISED TWO": OUT 673,1: RETURN: REM IF "TWO" IS RECOGNIZED BY BOTH AERODYNAMIC AND ACOUSTIC RECOGNIZERS THEN IDENTIFY THE INPUT SPEECH AS "TWO": REM TURN ON COMMANDED APPARATUS

5520 IF (AERO %=0 AND PEEK(4)=1) THEN PRINT "OVERALL SYSTEM RECOGNISED TEN": OUT 673,0: RETURN: REM IF "TEN" IS RECOGNIZED BY BOTH AERODYNAMIC AND ACOUSTIC RECOGNIZERS THEN IDENTIFY THE INPUT SPEECH AS "TEN": REM TURN OFF COMMANDED APPARATUS

5530 RETURN

This PROGRAM of TWO-DIMENSION SPEECH RECOGNITION LOGIC is an example of a specific software implementation illustrative of two dimension speech recognition in accordance with the teachings of the present invention. The software runs in the same personal computer used for implementing the acoustic recognizer 860.

Again, for simplicity, consider recognizing TWO and TEN. Referring to FIG. 8 and also the PROGRAM OF TWO-DIMENSION SPEECH RECOGNITION LOGIC, at the start of a process of the present invention a speech utterance 825, for example spoken TWO or TEN issued by the speaker may be input to system 800 and consequently the corresponding aerodynamic recognizer output 845, may be HIGH or LOW (ideally HIGH for TWO input and LOW for TEN input) and acoustic recognizer output 870, may be word (0) or word (1) (ideally, word(0) for TWO input and word (1) for TEN input). The output of recognizer 840 and that of recognizer 860 are tested, i.e. checked to find out whether the aerodynamic recognizer output 845 is consistent with aerodynamic property of utterance (0), i.e. utterance TWO and wether the acoustic recognizer out 870 is consistent with the acoustic property of utterance (0). In other words, whether the output 845 is HIGH or LOW, which is indicative of whether the aerodynamic wind of the input utterance 825 is directed towards the upper or lower aerodynamic wind transducer elements of the transducer array 830 which is adhered to the inner surface 910 by double-sided adhersive tape 920. If the aerodynamics and acoustics of utterance (0) are not recognized, the process proceeds to test for utterance (1), etc. Overall recognition is decided by the rules or logic embodied thereof. Accordingly, if the test is successful, i.e. the detected aerodynamics and acoustics of the input utterance are consistent with those of a candidate reference word, say word (1) then the input speech utterance 825 is overall recognized or identified to be word (1) and may be sent out as signal 888. In this manner of the present invention speech recognition based on the aerodynamics and acoustics of an input speech utterance is accomplished. Of course, the recognized speech utterance may be used for controlling another output signal or for achieving a speech command or utilised or fed to drive an output apparatus 890. For example, a prototype of the present invention may operate an external electrical apparatus by issuing TWO or TEN to turn the apparatus on or off, by the BASIC instructions OUT 673,1 or OUT 673,0 as shown in lines 5510 and 5520 of the PROGRAM OF TWO-DIMENSION SPEECH RECOGNITION LOGIC.

In a prototype of system 800 the listing shown in the PROGRAM OF TWO-DIMENSION SPEECH RECOGNITION LOGIC is merged with the program RECDEMO.BAS, and with the addition of a program line as follows:

2175 GOSUB 5500 the prototype works well.

From the foregoing description, it will be apparent that the system of the present invention provides a method and system for recognizing and utilizing speech air flow and acoustic speech sound which has advantages over the prior art.

While several embodiments of the system of the invention have been shown and described, changes and modifications may be made to the system without departing from the teaching of the invention and, therefore, the invention is only to be limited as necessitated by the accompanying claims.

I claim:

1. Apparatus capable of recognizing human speech utterances, comprising:
   (a) first means for inputting the magnitude of specific aerodynamic wind of a speech utterance;
   (b) second means for inputting the acoustic sound of said speech utterance;
   (c) third means coupled to first means for recognizing said aerodynamic wind;
   (d) fourth means coupled to second means for recognizing said acoustic sound; and
   (e) means coupled to third means and fourth means for overall recognition of said speech utterance.

2. The apparatus of claim 1, further comprising headgear having a structure enabling first means and second means to be wearable on a speaker's head for issuing said speech utterance.

3. Apparatus operable with speech commands, comprising
   (a) first means for inputting an aerodynamic wind of a live spoken command;
   (b) second means for inputting the acoustic sound of said live spoken command;
   (c) third means for acquired aerodynamic properties of said aerodynamic wind;
   (d) fourth means for acquiring acoustic properties of said acoustic sound; and
   (e) means coupled to third means and fourth means for selecting in accordance with the acquired aerodynamic properties thereof and the acquired acoustic properties thereof a specific overall response to said live spoken command.

4. The apparatus of claim 3, further comprising headgear having a structure enabling first means and second means to be wearable on a speaker's head for issuing said live spoken command.

5. Method for accomplishing a speech command, comprising the steps of:
   (a) inputting an aerodynamic wind pattern of said speech command and an acoustic component of said speech command respectively;
   (b) recognizing said aerodynamic wind pattern and said acoustic component respectively; and
   (c) selecting a specific response to said speech command, said specific response being varied according to the respective aerodynamic recognition and acoustic recognition thereof.

6. Apparatus for recognizing a speech command, comprising:
  (a) an aerodynamic wind transducer array for measuring aerodynamic properties of speech input;
  (b) an aerodynamic recognizer for recognizing the input speech in accordance with the measured aerodynamic properties;
  (c) a microphone for accepting speech input;
  (d) an acoustic recognizer for recognizing speech in accordance with acoustic properties; and
  (e) recognition logic for recognizing a specific command based on the aerodynamic recognizer and the acoustic recognizer.

7. The apparatus of claim 6, further comprising headgear having a structure enabling said aerodynamic wind transducer array and said microphone to be wearable on a speaker's head for issuing said specific command.

* * * * *